(12) United States Patent
Yang et al.

(10) Patent No.: US 10,144,895 B2
(45) Date of Patent: Dec. 4, 2018

(54) LUBRICATION STRUCTURE FOR A SHOCK ABSORBER OF VEHICLE

(71) Applicants: Hsiu-Sheng Yang, Taichung (TW); Kuo-Shen Chi, Taichung (TW)

(72) Inventors: Hsiu-Sheng Yang, Taichung (TW); Kuo-Shen Chi, Taichung (TW)

( * ) Notice: Subject to any disclaimer, the term of this patent is extended or adjusted under 35 U.S.C. 154(b) by 0 days.

(21) Appl. No.: 15/409,686

(22) Filed: Jan. 19, 2017

(65) Prior Publication Data
US 2017/0240835 A1  Aug. 24, 2017

(30) Foreign Application Priority Data
Feb. 19, 2016 (TW) .............................. 105202446 U (51) Int. Cl.
| F16F 9/14 | (2006.01) |
| C10M 107/38 | (2006.01) |
| B60G 13/00 | (2006.01) |
| F16F 9/48 | (2006.01) |
| B60G 13/02 | (2006.01) |

(52) U.S. Cl.
CPC .......... *C10M 107/38* (2013.01); *B60G 13/00* (2013.01); *B60G 13/02* (2013.01); *C10M 2213/023* (2013.01); *C10M 2213/0626* (2013.01); *C10N 2250/08* (2013.01); *F16F 9/14* (2013.01); *F16F 9/48* (2013.01)

(58) Field of Classification Search
CPC ......... C10M 2213/023; C10N 2250/08; B60G 13/00; B60G 13/02; F16F 9/48; F16F 9/14

USPC ................................................... 508/100–109
See application file for complete search history.

(56) References Cited

U.S. PATENT DOCUMENTS

| 4,626,365 | A | * | 12/1986 | Mori | ..................... | B25D 17/046 |
| | | | | | | 508/106 |
| 5,780,396 | A | * | 7/1998 | Tanaka | ..................... | B32B 15/08 |
| | | | | | | 508/104 |
| 6,149,176 | A | * | 11/2000 | Fujii | ....................... | B62K 25/30 |
| | | | | | | 192/209 |
| 6,162,767 | A | * | 12/2000 | Adam | ................... | C08K 3/0008 |
| | | | | | | 508/104 |
| 6,260,832 | B1 | * | 7/2001 | Vignocchi | ............ | B60G 15/061 |
| | | | | | | 188/282.5 |
| 6,498,127 | B1 | * | 12/2002 | Niwa | ...................... | F16C 33/14 |
| | | | | | | 428/550 |

(Continued)

*Primary Examiner* — Ellen M McAvoy
(74) *Attorney, Agent, or Firm* — Alan D. Kamrath; Kamrath IP Lawfirm, P.A.

(57) ABSTRACT

A lubrication structure for a shock absorber of a vehicle has a protecting pipe and a self-lubricating layer. The protecting pipe is a non-circular metal tube and has an elongated slit. The self-lubricating layer is an engineering plastic layer, is deposited in the protecting pipe and has a shaft hole. When the lubrication structure is deposited between an outer tube and an inner tube of a shock absorber of a vehicle, the protecting pipe engages in the outer tube to prevent the self-lubricating layer from contacting the outer tube directly. The self-lubricating layer with a small friction coefficient is mounted around the inner shaft to enable the inner shaft to move smoothly relative to the outer tube. The lubrication structure has characteristics of low cost, small volume, and small tolerance, and the life and the practicality of the lubrication structure can be improved.

14 Claims, 6 Drawing Sheets

(56) References Cited

U.S. PATENT DOCUMENTS

| | | | |
|---|---|---|---|
| 2005/0196605 A1* | 9/2005 | Ramsey | C08F 2/46 |
| | | | 428/323 |
| 2006/0041047 A1* | 2/2006 | Ramsey | B82Y 30/00 |
| | | | 524/430 |
| 2006/0138743 A1* | 6/2006 | Beal | B62K 25/04 |
| | | | 280/275 |
| 2011/0018227 A1* | 1/2011 | Thorpe | B62K 25/04 |
| | | | 280/284 |
| 2012/0146311 A1* | 6/2012 | Williams | B62K 21/02 |
| | | | 280/276 |
| 2014/0023817 A1* | 1/2014 | Kaushik | C08L 67/03 |
| | | | 428/66.1 |

* cited by examiner

LUBRICATION STRUCTURE FOR A SHOCK ABSORBER OF VEHICLE

BACKGROUND OF THE INVENTION

1. Field of the Invention

The present invention relates to a lubrication structure and, more particularly, to a lubrication structure for a shock absorber of a vehicle that can be formed by two components.

2. Description of Related Art

The riding of bicycles is increasingly popular in today's society. In order to increase the ride comfort, conventional shock absorbers are usually deposited at the front fork, the rear fork or the seat tube of the bicycle to absorb the impact that is generated when riding on the road, and this may provide a buffering effect to the riders. The conventional shock absorber has an outer tube, an inner shaft, a damping device, and a bearing. The inner shaft is mounted in the outer tube. The damping device is deposited between the outer tube and the inner shaft, and is compressible and stretchable. The bearing is mounted between an internal surface of the outer tube and an external surface of the inner shaft, is used for lubrication, and may be a ball bearing or a roller bearing. Then, the outer tube may move upwardly or downwardly relative to the inner shaft smoothly.

However, the cost and the volume of the bearing of the conventional shock absorber are high and large, and the tolerances of the bearing will influence the assembly and use. If the designed tolerance of the bearing is too small, the outer tube may not move smoothly relative to the inner shaft, and if the bearing is designed with larger tolerance dimensions, the frequency and force of impacting the bearing will increase when the conventional shock absorber bears an internal force, and this will reduce the life of the bearing.

Therefore, a conventional self-lubricating bearing is used to replace the bearing of the conventional shock absorber, and the conventional self-lubricating bearing is formed by an engineering plastic pipe. Since the engineering plastic pipe has characteristics of wear resistance, high/low temperature resistance, and low coefficient of friction, and may achieve the benefits of low cost, small size, and small tolerance. However, the structural strength of the conventional self-lubricating bearing is weak and may crack when bearing a greater impact and may lose the self-lubricating effect. Then, the life and the practicality of the conventional self-lubricating bearing are short and are not good. Although the structural strength of the conventional self-lubricating bearing can be increased by increasing the thickness, the advantages of small size may be lost.

To overcome the shortcomings, the present invention provides a lubrication structure for a shock absorber of a vehicle to mitigate or obviate the aforementioned problems.

SUMMARY OF THE INVENTION

The main objective of the present invention is to provide a lubrication structure for a shock absorber of a vehicle that may have characteristics of a small friction coefficient, low cost, small size and small tolerance, and may improve the durability and life of the lubrication structure.

The lubrication structure for a shock absorber of a vehicle has a protecting pipe and a self-lubricating layer. The protecting pipe is a non-circular metal tube and has an elongated slit. The elongated slit has an extending direction which is the same as an extending direction of an axis of the protecting pipe. The self-lubricating layer is an engineering plastic layer, is deposited in the protecting pipe and has a shaft hole. When the lubrication structure is deposited between an outer tube and an inner tube of a shock absorber of a vehicle, the protecting pipe engages in the outer tube to prevent the self-lubricating layer from contacting the outer tube directly. The self-lubricating layer with a small friction coefficient is mounted around the inner shaft to enable the inner shaft to move smoothly relative to the outer tube. The lubrication structure has characteristics of low cost, small volume, and small tolerance, and the life and the practicality of the lubrication structure can be improved.

Other objectives, advantages and novel features of the invention will become more apparent from the following detailed description when taken in conjunction with the accompanying drawings.

DETAILED DESCRIPTION OF THE PREFERRED EMBODIMENT

Embodiments

Figure 1:
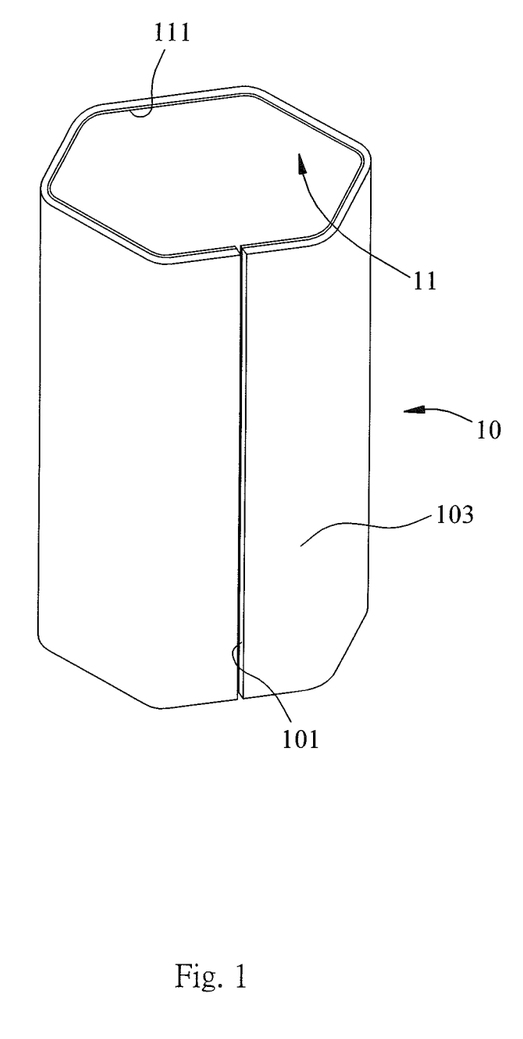
FIG. 1 is a perspective view of a lubrication structure for a shock absorber of a vehicle in accordance with the present invention.
Figure 2:
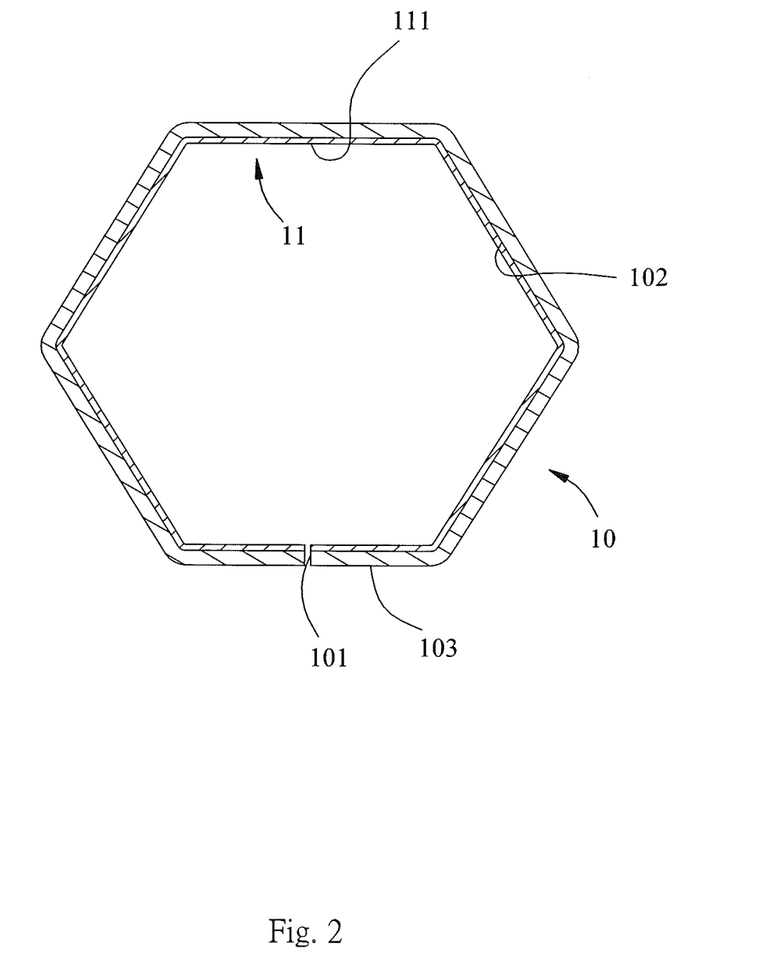
FIG. 2 is a top sectional view of the lubrication structure for a shock absorber of a vehicle in FIG. 1.
Figure 3:
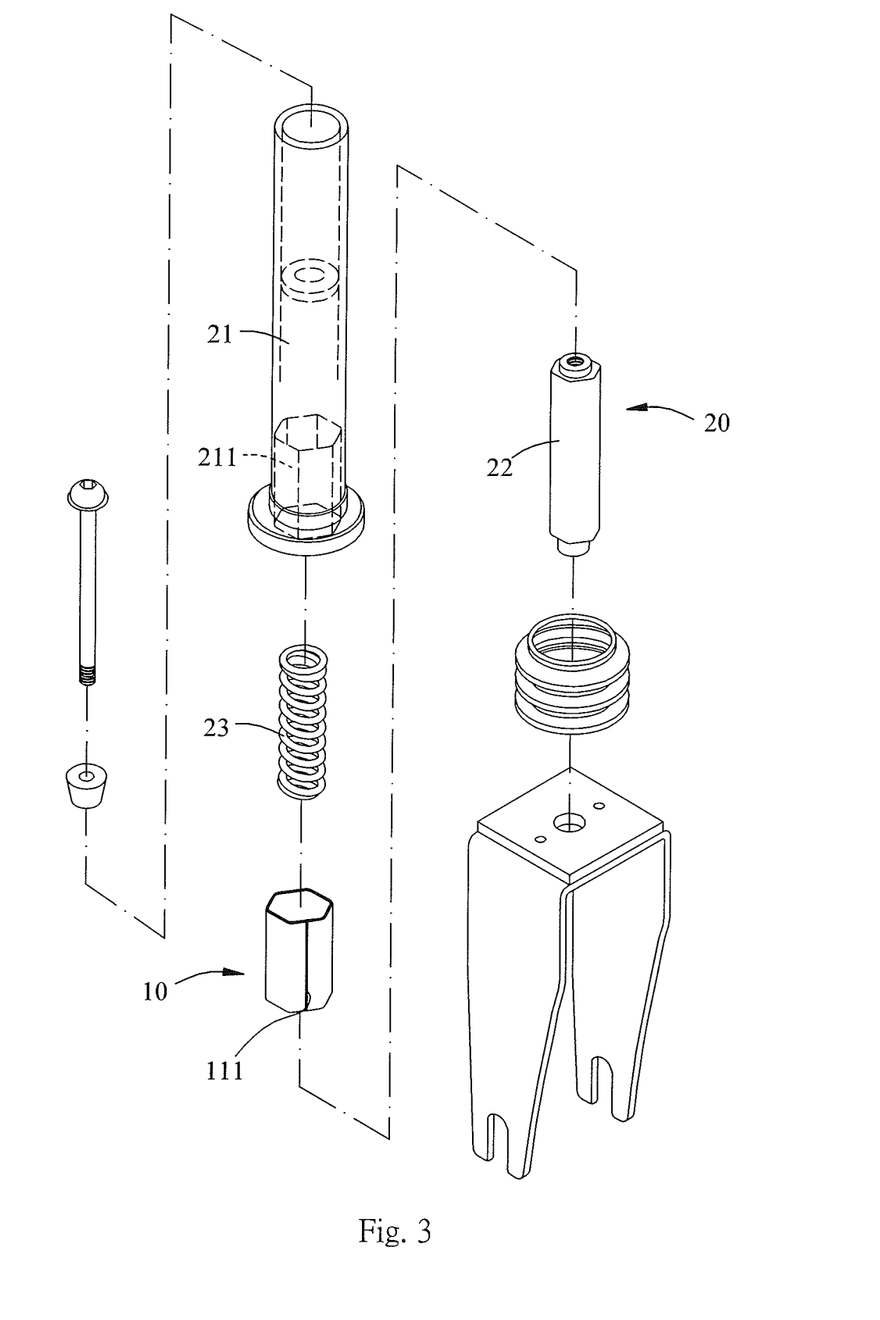
FIG. 3 is an exploded perspective view of the lubrication structure for a shock absorber of a vehicle in FIG. 1, deposited on a shock absorber of a vehicle.
Figure 4:
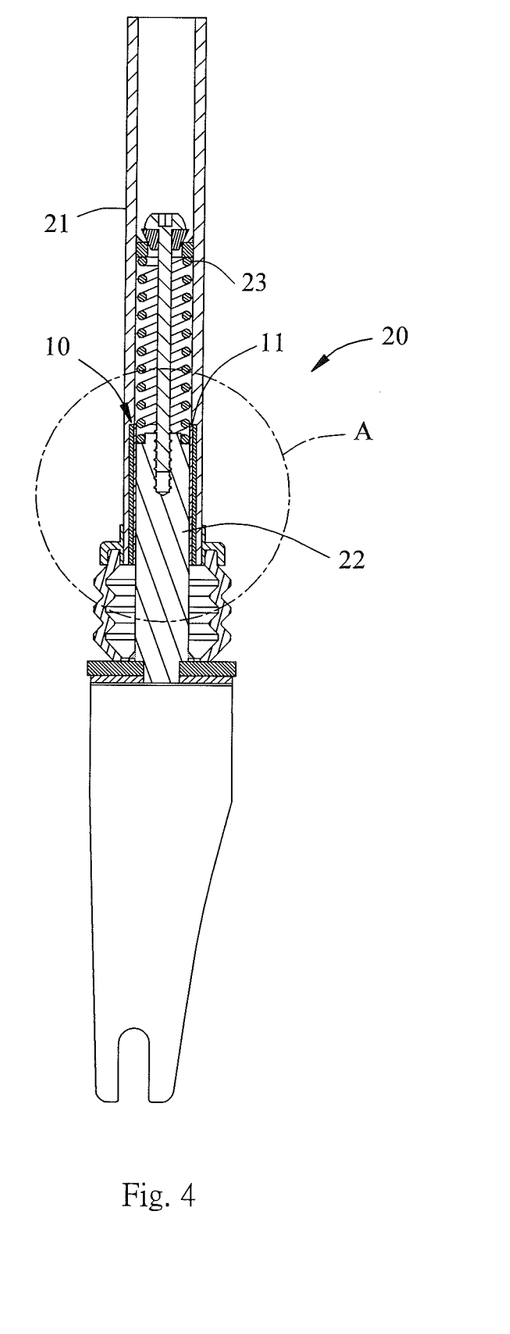
FIG. 4 is a cross sectional side view of the lubrication structure for a shock absorber of a vehicle in FIG. 3.
Figure 5:
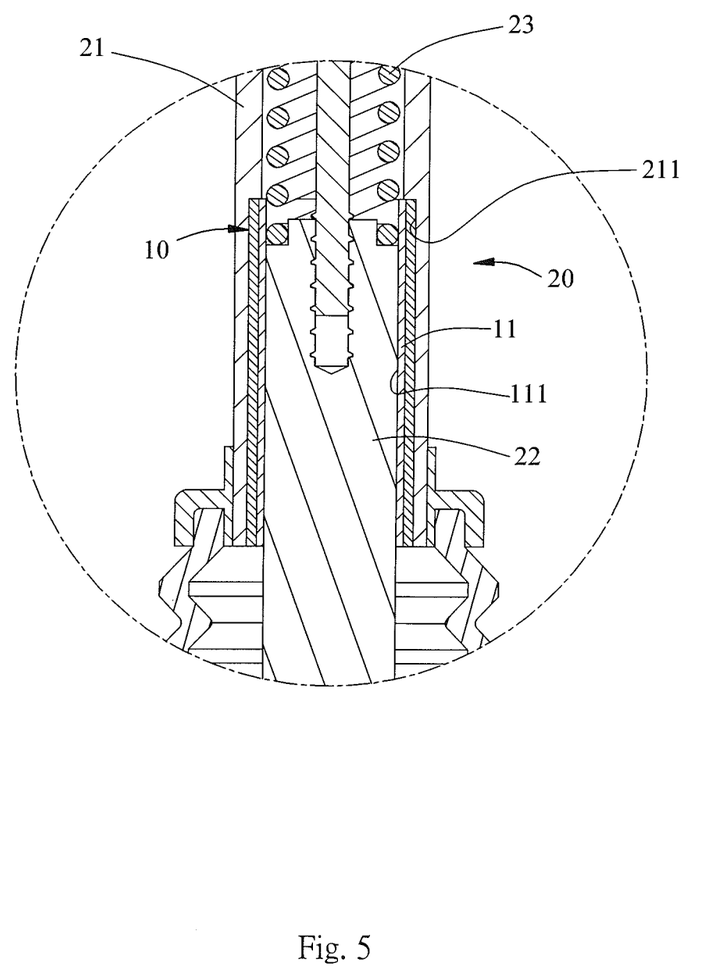
FIG. 5 is an enlarged and cross sectional side view of the lubrication structure for a shock absorber of a vehicle at a circle A in FIG. 4.
Figure 6:
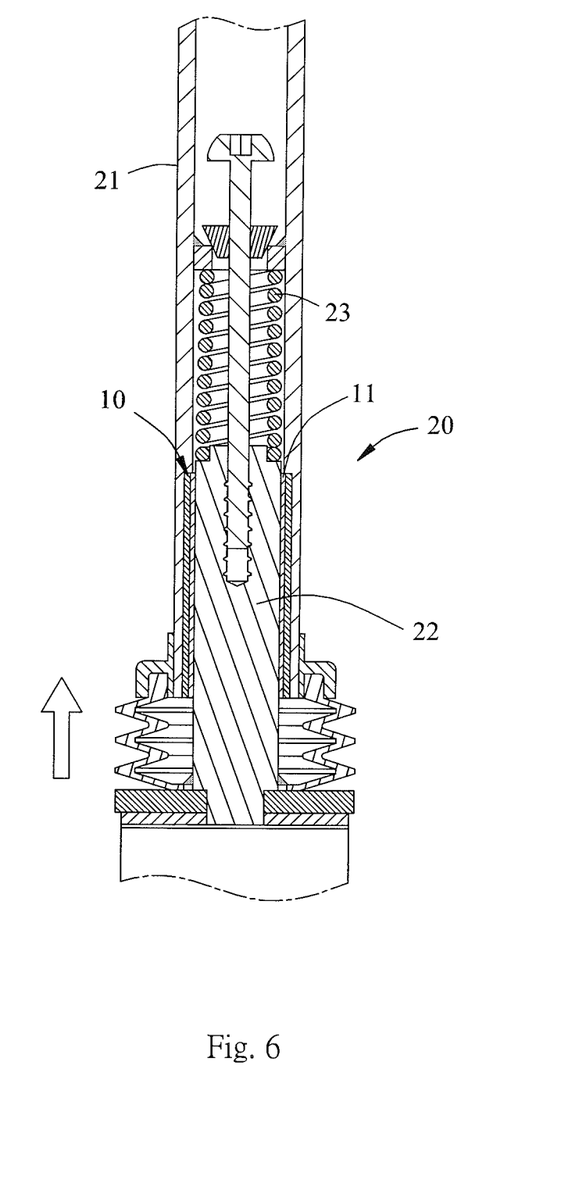
FIG. 6 is an operational and cross sectional side view of the lubrication structure for a shock absorber of a vehicle in FIG. 4.

With reference to FIGS. 1 and 2, a lubrication structure for a shock absorber of a vehicle in accordance with the present invention has a protecting pipe 10 and a self-lubricating layer 11. The protecting pipe 10 may be a non-circular metal tube that is bent by a metal plate, such as a polygonal metal tube. Preferably, the protecting pipe 10 is a hexagonal metal pipe, and has an elongated slit 101 formed through one of six faces of the protecting pipe 10. An extending direction of the elongated slit 101 is the same as an extending direction of an axis of the protecting pipe 10. Furthermore, two adjacent sides of the protecting pipe 10 are separated by the elongated slit 101. In addition, the protecting pipe 10 has an internal surface 102 and an external surface 103, and the elongated slit 101 is formed through the internal surface 102 and the external surface 103 of the protecting pipe 10.

The self-lubricating layer 11 may be an engineering plastic layer, and may be a Teflon layer, preferably. The self-lubricating layer 11 may be deposited on the internal surface 102 of the protecting pipe 10 by electroplating, and a non-circular shaft hole 111 is formed in the self-lubricating layer 11. Preferably, the shaft hole 111 of the self-lubricating layer 11 is a hexagonal hole. The protecting pipe 10 is mounted around the self-lubricating layer 11 to protect the self-lubricating layer 11. The self-lubricating layer 11 may be formed on a surface of a metal plate before bending the metal plate to form the protecting pipe 10, and this bends the self-lubricating layer 11 into a hexagonal pipe together with the metal plate.

Additionally, the protecting pipe 10 may be formed by bending the metal plate, and may be also formed by drawing a metal tube. The elongated slit 101 is formed on the drawn metal tube by cutting. Furthermore, the self-lubricating layer 11 may be a Teflon layer formed on the internal surface 102 of the protecting pipe 10 by electroplating, and may be an engineering plastic layer deposited on the internal surface 102 of the protecting pipe 10 by pasting.

With reference to FIGS. 3 to 6, the lubrication structure of the present invention is used on a shock absorber 20 of a vehicle, and the shock absorber 20 has an outer tube 21, an inner shaft 22 partially deposited in the outer tube 21, and a damping device 23 deposited between the outer tube 21 and the inner shaft 22. The outer tube 21 has an inner hole 211 deposited on a bottom of the outer tube 21, and the inner hole 211 may be a hexagonal hole and corresponds to a shape of the external surface 103 of the protecting pipe 10. Furthermore, an upper part of the inner shaft 22 is deposited in the outer tube 21, and the inner shaft 22 has a shape corresponding to the shape of the shaft hole 111 of the self-lubricating layer 11. The damping device 23 is compressible and stretchable, and is deposited between an internal surface of the outer tube 21 and a top end of the inner shaft 22.

In assembly, the lubrication structure is mounted around the inner shaft 22, and the protecting pipe 10 expands elastically since the protecting pipe 10 has the elongated slit 101 formed through the protecting pipe 10. Then, the protecting pipe 10 may clamp on an external surface of the inner shaft 22 elastically to accommodate the dimensional tolerances of the inner shaft 22. Due to the shapes of the protecting pipe 10 and the self-lubricating layer 11 being hexagonal, the outer tube 21 and the inner shaft 22 cannot rotate relative to each other. Then, the outer tube 21 may move upwardly or downwardly relative to the inner shaft 22 without rotating, and the damping device 23 may provide a buffering effect.

The lubrication structure for a shock absorber of vehicle as described in the present invention has the following advantages.

1. Since the protecting pipe 10 has the elongated slit 101 formed through the protecting pipe 10, and the protecting pipe 10 may clamp on the external surface of the inner shaft 22 elastically to accommodate the dimensional tolerances of the inner shaft 22.

2. The self-lubricating layer 11 is mounted around the inner shaft 22 and is an engineering plastic layer with a small friction coefficient, and this enables the inner shaft 22 to move smoothly along the shaft hole 111 of the self-lubricating layer 11.

3. The self-lubricating layer 11 is an engineering plastic layer and has characteristics of low cost, small volume, and small tolerance. The protecting pipe 10 is mounted around the self-lubricating layer 11 to protect the self-lubricating layer 11, and this may prevent the self-lubricating layer 11 from cracking when bearing a greater impact and may improve the life and the practicality of the lubrication structure.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A lubrication structure for a shock absorber of vehicle having:
   a protecting pipe being a non-circular metal tube and having
   an axis having an extending direction;
   an internal surface;
   an external surface; and
   an elongated slit formed through the internal surface and the external surface of the protecting pipe and having an extending direction same as the extending direction of the axis of the protecting pipe; and
   a self-lubricating layer being an engineering plastic layer, deposited on the internal surface of the protecting pipe and having a non-circular shaft hole.

2. The lubrication structure for a shock absorber of vehicle as claimed in claim 1, wherein the self-lubricating layer is a Teflon layer formed on the internal surface of the protecting pipe by electroplating.

3. The lubrication structure for a shock absorber of vehicle as claimed in claim 1, wherein protecting pipe is a polygonal metal tube, and the non-circular shaft hole of the self-lubricating layer is a polygonal hole.

4. The lubrication structure for a shock absorber of vehicle as claimed in claim 1, wherein the self-lubricating layer is formed on a surface of a metal plate before bending the metal plate to form the protecting pipe.

5. The lubrication structure for a shock absorber of vehicle as claimed in claim 2, wherein the self-lubricating layer is formed on a surface of a metal plate before bending the metal plate to form the protecting pipe.

6. The lubrication structure for a shock absorber of vehicle as claimed in claim 3, wherein the self-lubricating layer is formed on a surface of a metal plate before bending the metal plate to form the protecting pipe.

7. The lubrication structure for a shock absorber of a vehicle as claimed in claim 1, wherein the elongated slit extends through the self-lubricating layer.

8. Shock absorber of a vehicle comprising:
   an outer tube having a non-circular inner hole;
   an inner shaft reciprocally received in the non-circular inner hole in an extending direction and having a non-circular periphery;
   a damping device between the outer tube and the inner shaft; and
   a lubrication structure having:
      a protecting pipe being a non-circular metal tube and having:
         an internal surface;
         an external surface; and
         an elongated slit formed through the internal surface and the external surface of the protecting pipe and parallel to the extending direction; and
      a self-lubricating layer being an engineering plastic layer, deposited on the internal surface of the protecting pipe and having a non-circular shaft hole, wherein the external surface of the protecting pipe abuts with the non-circular inner hole of the outer tube, and wherein the non-circular periphery of the inner shaft is slideably received in the non-circular shaft hole of the self-lubricating layer.

9. The shock absorber for a vehicle as claimed in claim 8, wherein the elongated slit extends through the self-lubricating layer.

10. The shock absorber of a vehicle as claimed in claim 9, wherein the self-lubricating layer is a Teflon layer formed on the internal surface of the protecting pipe by electroplating.

11. The shock absorber of a vehicle as claimed in claim 9, wherein protecting pipe is a polygonal metal tube, and the non-circular shaft hole of the self-lubricating layer is a polygonal hole.

12. The shock absorber of a vehicle as claimed in claim 9, wherein the self-lubricating layer is formed on a surface of a metal plate before bending the metal plate to form the protecting pipe.

13. The shock absorber of a vehicle as claimed in claim 8, wherein the self-lubricating layer is formed on a surface of a metal plate before bending the metal plate to form the protecting pipe.

14. The shock absorber of a vehicle as claimed in claim 10, wherein the self-lubricating layer is formed on a surface of a metal plate before bending the metal plate to form the protecting pipe.

* * * * *